(12) United States Patent
Kurowski et al.

(10) Patent No.: US 10,174,859 B2
(45) Date of Patent: Jan. 8, 2019

(54) VALVE, IN PARTICULAR A REGULATING OR SHUT-OFF VALVE, FOR LIQUID OR GASEOUS MEDIA

(71) Applicant: Otto Egelhof GmbH & Co. KG, Fellbach (DE)

(72) Inventors: Krzysztof Kurowski, Fellbach (DE); Juergen Sohn, Esslingen (DE)

(73) Assignee: OTTO EGELHOF GMBH & CO. KG, Fellbach (DE)

( * ) Notice: Subject to any disclaimer, the term of this patent is extended or adjusted under 35 U.S.C. 154(b) by 0 days.

(21) Appl. No.: 14/683,244

(22) Filed: Apr. 10, 2015

(65) Prior Publication Data

US 2015/0292641 A1 Oct. 15, 2015

(30) Foreign Application Priority Data

Apr. 10, 2014 (DE) .................. 10 2014 105 100

(51) Int. Cl.
*F16K 31/00* (2006.01)
*F16K 31/02* (2006.01)

(52) U.S. Cl.
CPC .................. *F16K 31/025* (2013.01)

(58) Field of Classification Search
CPC ................. F16K 31/205; F16K 1/34
USPC ...................... 251/11, 319, 66, 68
See application file for complete search history.

(56) References Cited

U.S. PATENT DOCUMENTS

| | | | |
|---|---|---|---|
| 3,613,732 A | 10/1971 | Willson et al. | |
| 3,835,659 A | 9/1974 | McBride, Jr. | |
| 7,815,161 B2 * | 10/2010 | Saitoh | F16K 31/025 251/11 |
| 8,616,237 B2 * | 12/2013 | Jansen | F15B 13/0405 137/613 |
| 2015/0354719 A1 * | 12/2015 | van Beek | F16K 31/025 251/11 |

FOREIGN PATENT DOCUMENTS

| | | |
|---|---|---|
| DE | 592886 C | 2/1934 |
| DE | 3635216 A1 | 4/1988 |
| DE | 19934827 C1 | 5/2001 |
| DE | 202012104460 U1 | 2/2014 |
| EP | 2781742 A1 | 9/2014 |
| GB | 2106190 A | 4/1983 |
| JP | 61019368 A | 1/1986 |
| WO | 0250460 A1 | 6/2002 |
| WO | 03105939 A1 | 12/2003 |
| WO | 2012106415 A1 | 8/2012 |
| WO | 2014111397 A1 | 7/2014 |

* cited by examiner

*Primary Examiner* — Umashankar Venkatesan
(74) *Attorney, Agent, or Firm* — Kriegsman & Kriegsman

(57) ABSTRACT

The invention concerns a valve, in particular a regulating or shut-off valve, for liquid or gaseous media having a valve housing (12), which has at least one through hole (14), having a valve seat (17), which is closed by a valve closing component (31), having a drive (35) that is connected to the valve housing (12), which has at least one control element (39) made of a shape memory alloy for controlling the opening and closing motion of the valve closing component (31), and operates the valve closing component (31) to open or close the through hole (14), and the control element (39) is formed of at least one wire element is at least partly encompassed by a protective cover (45).

13 Claims, 3 Drawing Sheets

VALVE, IN PARTICULAR A REGULATING OR SHUT-OFF VALVE, FOR LIQUID OR GASEOUS MEDIA

FIELD OF THE INVENTION

The invention concerns a valve, in particular a regulating or shut-off valve, for liquid or gaseous media having a valve housing, which has at least one through hole, which connects an inlet with an outlet, having a valve seat that is arranged on the valve closing housing and encompasses the through hole, which is closed by a valve closing component, which is arranged in regulating space of the valve housing formed between the inlet and the outlet, having a drive that is connected to the valve housing, which has at least one control element made of a shape memory alloy for controlling the opening and closing motion of the valve closing component, and operates the valve closing component to open or close the through hole, and having a returning element, which works against a closing or opening motion of the valve closing component.

BACKGROUND OF THE INVENTION

From DE 20 2012 104 460 U1, a shut-off valve is known that comprises a valve housing with an opening, which connects an inlet and an outlet. The through hole is encompassed by a valve seat, which opens and closes the opening using a valve closing component which is able to be arranged thereon. The valve closing component is operated by a drive for controlling the opening and closing motion, wherein the drive comprises at least one control element made of a shape memory alloy. The opening motion of the valve closing component works against a returning element. This shut-off valve provides the control element with shielding against the media flowing between the inlet and the outlet by a sealing element, which is provided in the regulating space.

The object of the invention is to put forward a valve that can be manufactured even more simply and hence cost-efficiently in its construction.

SUMMARY OF THE INVENTION

Accordingly an embodiment of the present invention is directed to a valve, in particular a regulating or shut-off valve, for liquid or gaseous media having a valve housing, which has at least one through hole, which connects an inlet with an outlet, having a valve seat that is arranged on the valve closing housing and encompasses the through hole, which is closed by a valve closing component, which is arranged in regulating space of the valve housing formed between the inlet and the outlet, having a drive that is connected to the valve housing, which has at least one control element made of a shape memory alloy for controlling the opening and closing motion of the valve closing component, and operates the valve closing component to open or close the through hole, and having a returning element, which works against a closing or opening motion of the valve closing component, wherein the control element is formed of at least one wire element, which operates between a contact point of the valve closing component and a contact point on the valve housing, or a housing section that is attached to it, and that the control element is at least partly encompassed by a protective cover.

Due to the embodiment of the controlling element consisting of at least one wire element made of a shape memory alloy, which is surrounded with a protective cover, a precise control of the opening and closing motion over the wire element is made possible, without any adverse effect arising due to the medium flowing through the regulating space. Moreover, this protective cover can result in a shielding of the wire element for controlling the opening and closing element of the valve closing component against medium flowing through. This results particularly in a thermal insulation of the wire element, and the activation energy for the desired contraction of the wire element is achieved in a controlled fashion by the energization of the wire element from the shape memory alloy or the closing motion of the valve closing component.

According to a further embodiment, the protective cover is put loosely over the wire element, so that an annular gap is formed between the cover and the wire element, and the annular gap is filled with the medium. This annular gap is preferably made narrow, so that in the case of a non-simmering medium, or a medium that is not simmering in the immediate surroundings of the control element, only a thin film of the medium can form between the wire element and the protective cover. In turn, thermal insulation can thereby occur, as this thin film of the medium forms in a stationary manner in the annular gap between the wire element and the protective cover. The annular gap thereby heats up. There is no outflow of the heat energy, which means that the response time for control of the displacement of the valve closing component is reduced. In the case of a simmering medium, evaporation of the medium can occur in the annular gap due to the energization of the control element, so that a layer of air or steam is formed in the annular gap, which forces the liquid medium out of the annular gap and the annular gap in particular becomes free of liquid. A thermal insulation is likewise present due to this air or steam layer, due to which an improved control and an improved response by the control element is also available. The annular gap is preferably formed so as to be between 0.01 mm and 0.2 mm. As soon as the control or energization of the control element ends, the annular gap once again fills with medium.

An alternative embodiment provides for the protective cover to rest on the wire element, i.e. for an inner skin surface of the protective cover to rest on a perimeter of the wire element. Such an embodiment also makes possible a working motion of the wire element made of a shape memory alloy. Particularly with very thin protective covers, or protective covers with low wall thicknesses, the working stroke of the wire element is not influenced.

A preferred embodiment provides for the sheath to be made of an extensible plastic. Preferably, a plastic sheath made of Teflon is provided, which not only has the property of flexibility, but also a low level of slide friction, so that the wire element can execute a working stroke without adverse effects.

The length of the protective cover can correspond to a length of the activated wire element between the point of contact on the valve closing component and the valve housing, in an arrangement of the valve closing component in a maximally open position according to a first embodiment, or it can be made slightly shorter. The wire element would thereby be prevented, for example, from having to additionally work against the protective cover during an opening motion when there is a contraction of the wire element.

The protective cover, which forms an annular gap between its inner skin surface and the control element, has at least one, preferably two, through holes arranged with a gap between them, which connect the annular gap with the surroundings outside the protective cover. The attachment of at least two through holes with a gap between them is preferably provided if the protective cover is made the same length as the control element or shorter. This makes it possible that, in a medium that simmers in the annular gap during the energization of the control element, the liquid layer remaining in the annular gap can be forced out of the protective cover due to the steam layer forming, so that a steam layer and nothing else can form between the control element and the protective cover. The response of the control element is thereby accelerated and so improved aeration or closing motions, or control motions for the valve closing mechanism, are made possible.

Preferably, the protective cover surrounds the wire element in the contact point on the valve closing component. This has the particular advantage that cooling of the wire element on the contact point is prevented. Due to the medium flowing through, in the area of the opening, temperature changes can occur that can cause adverse effects to the working stroke of the valve closing component, however these are prevented by the protective cover arranged in the area of the contact point.

The at least one wire element and the protective cover surrounding the wire element are preferably fasted together onto the valve closing component, in particular clamped or crimped on. This makes cost-efficient manufacture possible.

Furthermore, it is preferably provided that the at least one wire element is diverted on the valve closing component at least once by means of a deviation point, and a protective cover is provided on each section of the wire element between the deviation point on the valve closing component and the contact point on the valve housing. For example, such a deviation point can be formed by a loop or pin, in order to divert the wire element by 180°. For example, a double positioning force can be generated by a simple deviation of a wire element, due to which the valve closing component can be activated. This has the additional advantage that the wire element has double the length, due to which twice as high an ohmic resistance is formed, which makes better regulation of the working stroke using the current feed of the wire element.

An alternative embodiment provides that the at least one wire element is diverted once on the deviation point of the valve closing component and the protective cover of the wire element extends at least the length of the deviation point. Due to this, not only can a thermal insulation of the wire element in the area of the deviation point be achieved, particularly on the valve closing component, but also an improved slide friction in the deviation point itself, due to which the lifespan in turn is increased and the functionality improved.

According to a further advantageous embodiment of the invention, it is provided that the protective cover extends all the way along the wire element. A complete thermal insulation of the wire element is thereby made possible, so that no heat exchange occurs between the wire element and the surrounding medium.

The protective cover and the wire element are advantageously fastened to each contact point, crimped in particular. This makes cost-efficient manufacture possible The protective cover, which extends over the whole length of the wire element, is preferably thrust out or fastened to the particular contact points under tensile stress. This has the advantage that upon impact of the wire element with the working stroke, the wire element only has to work against the positioning force of the returning element, and no additional compression of the protective cover is required, in order to carry out an opening motion of the valve closing component.

The at least one control element of the valve is preferably activated by means of control equipment, which activates the opening and closing motion of the valve closing component dependent on at least one control variable, in particular the temperature of the liquid and gaseous medium. Consideration of at least one further control variable makes possible a characteristic map regulation of the control element, in order to control the opening and closing position of the valve closing component. At a specific temperature of the cooling medium in the regulating space, when there is a predetermined current feed of the control element, a defined displacement to open or close the valve can be activated. To the extent that the temperature of the liquid and gaseous medium changes, for example, a changed or rather adapted current feed is required for the same displacement. This can be determined in the front end, in order to determine and establish a characteristic map of the displacement according to the current feed, depending on the temperature of the liquid or gaseous medium. Further parameters, such as, for example, the number of control elements, the diameters of the control components, and also the special alloy selection of a shape memory alloy for such control elements, can likewise come into consideration. A characteristic map for the opening and closing motion of the valve closing component is thereby made possible by means of the control, which represents, for example, a function of the heat loss or the thermal heating of the control element in the surroundings.

BRIEF DESCRIPTION OF THE DRAWINGS

The invention and further advantageous embodiments and further developments of them are described and explained in more detail in what follows by means of examples shown in the drawings. The characteristics that can be taken from the description and the drawings can be applied individually themselves or together in any combination according to the invention. Shown are.

DETAILED DESCRIPTION OF THE INVENTION

Figure 1:
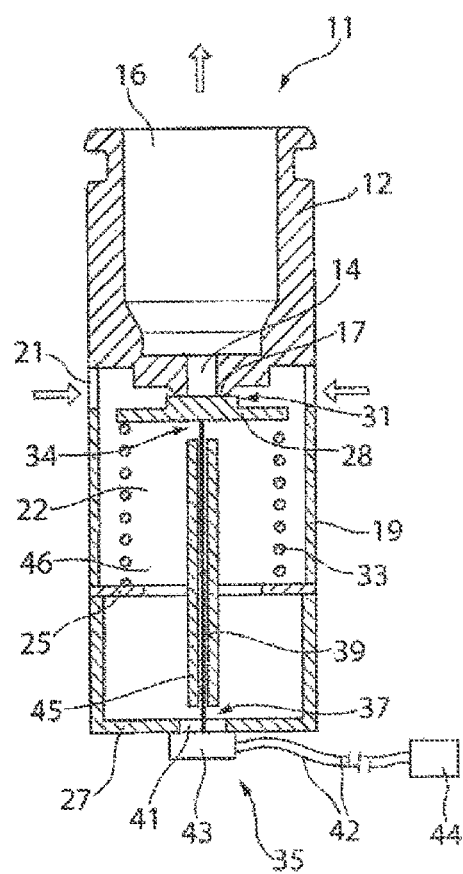
FIG. 1 a schematic cross-section of a first embodiment of a valve according to the invention, FIG. 2 a schematic cross-section of a first alternative embodiment to FIG. 1, FIG. 3 a schematic cross-section of a second alternative embodiment to FIG. 1, FIG. 4 a schematic cross-section of an alternative embodiment to FIG. 3, and FIG. 5 a schematic cross-section of another alternative embodiment to FIG. 3.

In FIG. 1, a valve 11 according to the invention is shown, which is designed for example as a shut-off valve. This comprises a valve housing 12, which has a through hole 14, which discharges into an outlet 16. A valve seat 17 is arranged on an opposite end of the through hole, the valve seat has, for example, a crater-shaped ridge. Furthermore, a sheath-shaped housing section 19 is provided on the valve housing 12. The housing section can be arranged in one piece on the valve housing 12. Alternatively, this can also be attached to the valve housing 12 by a detachable connection, such as a screwed connection or a firmly-bonded connection. The sheath-shaped housing section 19 has at least one inlet 21, through which a liquid or gaseous medium gets into a regulating space 22. This regulating space 22 is bordered by the sheath-shaped housing section 19.

A shoulder or fastening section 25 can be arranged on the sheath-shaped housing section 19. This fastening section 25 can be formed from a ring or disc-shaped element, which can be arranged in a second sheath-shaped housing section 19 between a first and second housing section, or a sheath section and second lid. Alternatively, such a fastening section 25 can be formed on one of the two sections: the sheath section or the lid section. Alternatively, it can also be formed just by a reduction in the diameter in the form of a shoulder on the lid. Abutting this fastening section 25 is a returning element 33, which on the opposite side grips onto a retaining section 28, which is formed on a valve closing component 31. Alternatively, it can be provided that the returning element 33 abuts onto the base 27 of the sheath-shaped housing section 19 instead of a fastening section 25.

The valve closing component 31 is located on the valve seat 17 in a closed position, preferably directly, and is held in this position by the returning element 33. In this way the valve 11 is closed. The valve closing component 31 can have a retaining section 28, which can be formed in one piece with the valve closing component. The retaining section 28 advantageously extends radially outwards and is arranged with a small annular gap to the wall of the sheath-shaped housing section 19, and can be guided along this. Guide sections can preferably be formed for this. The outer perimeter of the retaining section 28 can additionally also have grooves, so that the medium can flow completely through the regulating space 22.

The valve closing component 31 is operated by a drive 35 in order to open and close the through hole 14. The drive 35 comprises at least one control element 39, which is operated via control cables 42 by a control that is not shown in detail.

A first contact point 34 for the at least one control element 39 made of a shape memory alloy is provided on the valve closing component 31, or the retaining element 28. This control element 39 is preferably formed as a wire element. This extends from the contact point 34 to a contact point 37 arranged opposite, which is provided on the base 27 of the sheath-shaped housing section 19.

According to the exemplary embodiment shown, the control element 39 is formed as a wire element formed in a straight line, or as a rod-shaped wire element. Furthermore, this can also be a coiled wire element. Alternatively, several such wire elements can be provided relative to each other, for example aligned in a circle, in order to form a sort of rod cage.

The contact point 37 is located, for example, in the feed opening 41, on the base 27 of the sheath-shaped housing section 19 or in a sealing element 43 surrounding the feed opening 41, inside of which the control element 39 is connected with control cables 42, which are connected to the control device 44 in order to energize the control element 39.

The control element 39, which consists of a shape memory alloy, can be adapted to the medium depending on the particular usage and the control temperature.

The control element 39 is encompassed by a protective cover 45. This protective cover 45 fundamentally extends over the whole length of the control element 39, wherein the length of the protective cover 45 is as much shorter than the control element 39 as the maximum work stroke of the control element 39. Due to this, when opening the valve closing component 31 the requirement for an additional strain of the protective cover 45 due to the control element 39 can be avoided.

The protective cover 45 is formed to be located close to the control element 39. For example, an inner diameter of the protective cover corresponds to the outer diameter of the control element 39. The protective cover 45 is preferably formed of plastic. In particular, Teflon can be chosen. In this embodiment, in FIG. 1 it is provided that the protective cover 45 is arranged with a gap to the contact point 34 on the valve closing component 31 and to the contact point 37 on the base 27 on the control element 39.

Alternatively, it can be provided that the protective cover 45 is formed with an inner skin surface, which is larger than the outer perimeter of the control element 39 wire, so that between the protective cover 45 and the control element 39 a small annular gap is formed. For example, the control element 39 can comprise an exterior diameter of 0.3 mm and the inner skin surface of the protective cover 45 one of 0.4 mm. The protective cover 45 can thereby be slightly displaced relative to the control element 39.

Figure 2:
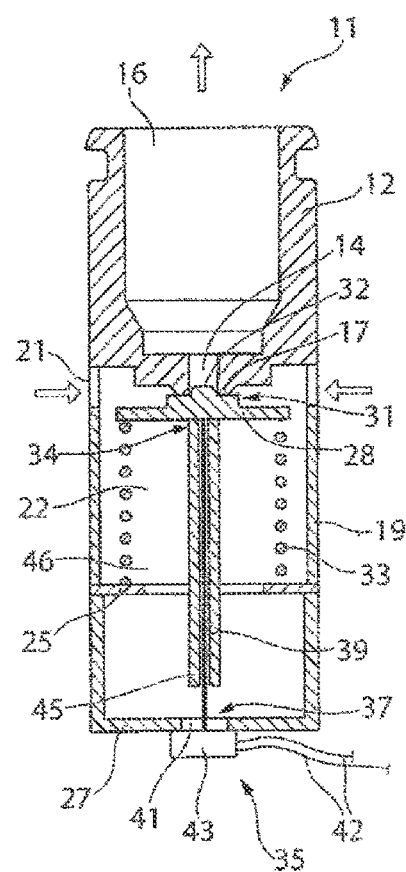

In FIG. 2, an alternative embodiment of the valve 11 is shown compared to FIG. 1. This embodiment distinguishes itself in that the protective cover 45 is just as much fastened in the contact point 34 as the control element 39. For example, the control element 39 and the protective cover 45 can be fastened to it together, in particular using a common crimping. This arrangement has the advantage that the control element 39 is thermally insulated in the area of the contact point 34. In this area, a cooling of the control element 39 in the contact point 34 can take place due to the circulation of the valve closing component 31. This is prevented by the arrangement of the protective cover 45. Alternatively, the protective cover 45 can also extend up to a lower contact point 37 and completely encompass the control element 39. Both can also be fastened together in the contact point 37.

In this embodiment according to FIG. 2, it can additionally be provided that near to the contact point 34 in the protective cover 45 at least one through hole 46 is provided, which connects the regulating space 22 with an annular gap formed between the protective cover 45 and the control element 39. Insofar as a medium is added that begins to simmer in the area of the annular gap between the control element 39 and the protective cover 45 upon supplying current to the control element 39, a faster forcing of the medium located in the annular gap is achieved, as this medium present in the annular gap can escape both on the one hand at one end of the protective cover 45 showing a gap to the seal 43, and also on the other hand on the opposite side over at least one through hole 46 arranged near to the contact point 34.

Furthermore, the valve 11 is formed, for example, as a regulating valve, and has, unlike the shut-off valve in FIG. 1, a cone-shaped closing contour 32 on the valve closing component 31 instead of a level closing surface, a closing contour that extends into the passage 14 and abuts on the valve seat 17.

Alternatively, the valve closing component 31 can also be provided according to FIG. 1, so that the valve 11 is formed according to FIG. 2 as a shut-off valve. This valve closing component 31 with the closing contour 32 can also be inserted in the valve 11 according to FIG. 1.

Figure 3:
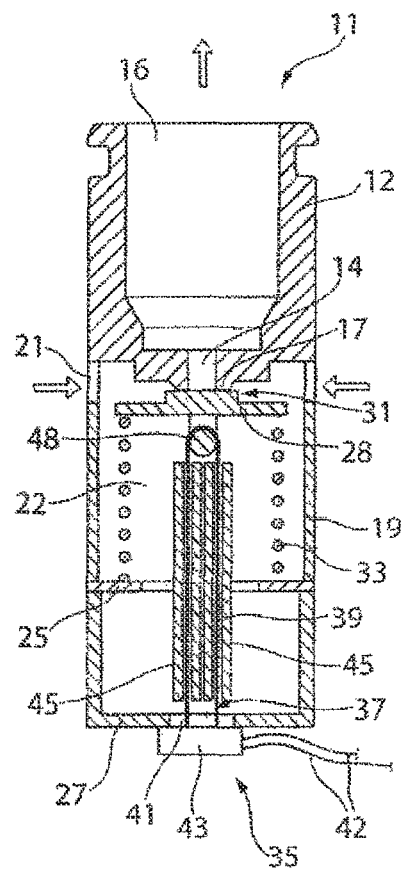

In FIG. 3, an alternative embodiment is shown to that in FIG. 1. This embodiment in FIG. 3 is different to the effect that, instead of the contact point 34, a deviation point 48 is provided, so that a simple diversion of the control element 39 is formed. This deviation point 48 can be formed, for example, by a pin, U-shaped loop or similar. A protective cover 45 is provided on the sections of the control element 39, between the deviation point 48 and each of the two contact points 37. The protective cover 45 can be formed, for example, analogously to the embodiment described in FIG. 1. The length of the protective cover 45 is thereby provided in such a way that the valve closing component 31 can carry out an unhindered opening motion up to the maximally open position, without the protective cover 45 working against this opening motion.

Obviously, several such simple diversions can be provided on the valve closing component 31. The deviation point or points 48 can just as well be provided on the base 27. It can also be provided that one or several deviation points 48 can be provided both on the valve closing component 31 and on the base 27, so that a control element 39 is diverted once or several times, or that several control elements 39 are diverted once or several times.

Figure 4:
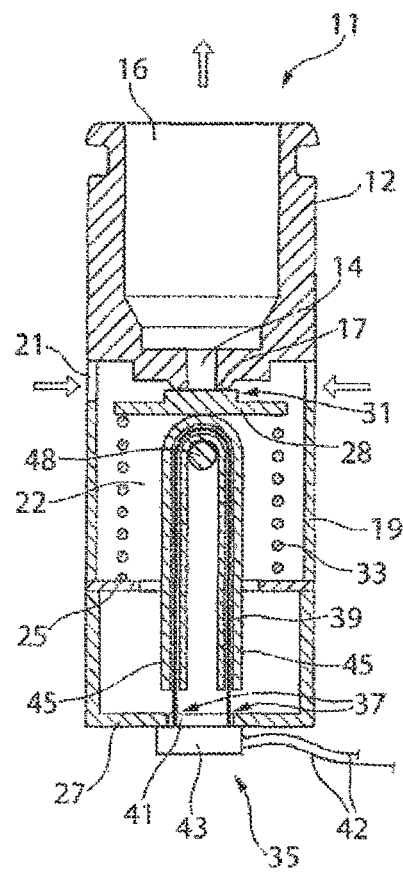

In FIG. 4, an alternative embodiment is shown to that in FIG. 3, to which reference is made. This embodiment is different to the effect that the control element 39 is surrounded by a protective cover 45, which likewise extends along the deviation point 48. This in turn has the advantage that in the deviation point 48 a thermal insulation of the control element 39 is given. In addition, an improved slip surface can be created for the control element 39 in the deviation point.

In this embodiment, too, it can be provided that at least one through hole is provided in the protective cover 45 neighbouring the deviation point 48 or near to the deviation point 48, in order to connect the regulating space 22 with the annular gap between the control element 39 and the protective cover 45. The method of action for the through hole described in FIG. 2 applies analogously in this embodiment.

Figure 5:
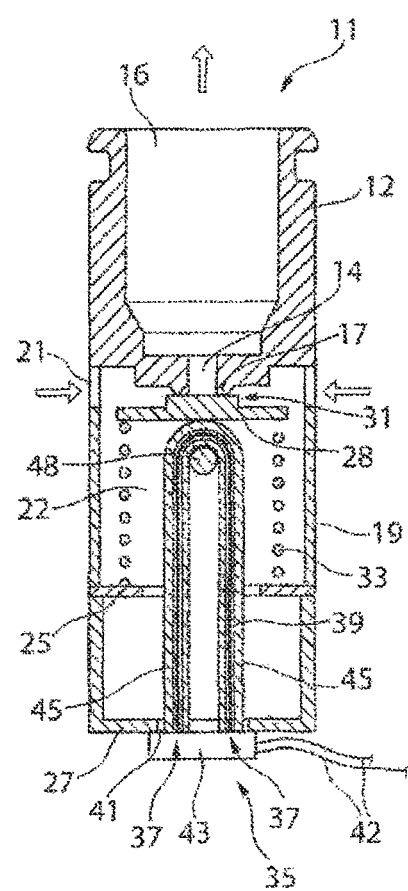

In FIG. 5, an alternative embodiment is shown to that in FIG. 4. This embodiment is modified to the effect that the protective cover 45 extends along the whole length of the control element 39. For example, the protective cover 45 is fastened with its two free ends onto the contact points 37. These ends can be crimped together with the ends of the control element 39. This arrangement has the advantage that not only a thermal insulation, but also an electrical insulation, of the control element 39 is given.

In the embodiment shown in FIG. 5, it can be provided that the protective cover 45 is thrust out or fastened under tensile stress.

Insofar as the medium flows through the valve 11, which begins to simmer upon activation of the control element 39 in the annular gap formed by the protective cover 45, at least one through hole is advantageously provided near to the deviation point 48 in at least one further through hole near to the particular contact point 37 in the protective cover 45, in order to make it possible for the still remaining liquid portion of the medium in the annular gap to flow out through the through hole in the regulating space 22 when the medium in the annular gap begins to evaporate.

In all the embodiments described above, these kinds of additional through holes can be provided in the protective cover 45, in order to enable the medium located in the annular gap to flow out fast, insofar as an evaporation process of the medium in the annular gap is set upon activation of the control element 39. At the same time, such through holes in turn enable the annular gap to fill quickly after the end of a control motion.

Of course, the arrangements and embodiments of the protective cover 45 and/or the deviation points 48 depicted in FIGS. 2 to 5 can also be provided interchanged. In particular, the deviation point 48 can also be provided on the base 27 of the valve housing 12, in particular the sheath-shaped housing section 19, instead of on the valve closing component 31. These embodiments apply both for one and for several control elements 39.

The valves 11 according to FIGS. 3 to 5 can likewise be formed either as a regulating valve or as a shut-off valve.

The embodiments described above therefore have the advantage that due to the arrangement of the protective cover 45 a substantially smaller amount of energy is required for the activation of the control motion of the valve closing component 31 than would be the case without a protective cover 45. By using this protective cover 45, the activation energy upon use of a liquid medium can be brought to the value of the activation energy upon operation with a gaseous medium.

The invention claimed is:

1. Valve, for liquid or gaseous medium having a valve housing, which has at least one through hole, which connects an inlet with an outlet, having a valve seat that is arranged on the valve housing and encompasses the through hole, which is closed by a valve closing component, which is arranged in a regulating space of the valve housing formed between the inlet and the outlet, having a drive that is connected to the valve housing, which has at least one control element made of a shape memory alloy for controlling the opening and closing motion of the valve closing component, and operates the valve closing component to open or close the through hole, and having a returning element, which works against a closing or opening motion of the valve closing component, wherein the control element is provided in the regulating space through which the medium flows, and is in contact with the medium,
the control element is formed of at least one wire element,
the control element is actuated with current by the drive,
the control element operates between a contact point of the valve closing component and a contact point on the valve housing or a housing section that is attached to it,
the control element is at least partly encompassed by a protective cover,
the protective cover is put loosely over the control element and a small annular gap is formed between the protective cover and the control element,
the length of the protective cover corresponds to the length of the activated control element upon arrangement of the valve closing component in a maximally open position, or is shorter,
and the annular gap is filled with the medium when the control element is not energized by the drive and a layer of air or steam is formed in the annular gap when the control element is energized by the drive.

2. Valve according to claim 1, wherein an inner skin surface of the protective cover rests on an outer perimeter of the control element.

3. Valve according to claim 1, wherein the protective cover is formed of plastic.

4. Valve according to claim 1, wherein the protective cover, which forms an annular gap between its interior skin surface and the control element, and the length of which fundamentally corresponds to the length of the non-activated control element or is slightly shorter, is provided with at least one through hole, which connects the annular gap with the surroundings outside the protective cover.

5. Valve according to claim 1, wherein the protective cover and the control element are fastened together at the contact point of the valve closing component.

6. Valve according to claim 1, wherein the protective cover and the control element are clamped or crimped together at the contact point of the valve closing component.

7. Valve according to claim 1, wherein the at least one control element is diverted at least once at one or several deviation points on the valve closing component or on the valve housing, and the protective cover of the at least one control element extends at least along the deviation point or points.

8. Valve according to claim 7, wherein the at least one control element and the protective cover encompassing the control element are fastened together at each contact point.

9. Valve according to claim 8, wherein the at least one control element and the protective cover encompassing the control element are crimped together at each contact point.

10. Valve according to claim 1, wherein the control element is activated with a control device, which activates the opening and closing motion of the valve closing component depending on at least one control variable.

11. Valve according to claim 1, wherein the control element is activated with a control device, which activates the opening and closing motion of the valve closing component depending on the temperature of the liquid or gaseous medium.

12. Valve according to claim 1, wherein the at least one control element is diverted at least once on the valve closing component at a deviation point, and a protective cover is provided on each section of the control element between the deviation point and the contact points of the valve closing component and the valve housing.

13. Valve according to claim 1, wherein the protective cover is formed of polytetrafluoroethylene.

* * * * *